(12) United States Patent
Bazzani et al.

(10) Patent No.: US 9,385,606 B2
(45) Date of Patent: Jul. 5, 2016

(54) AUTOMATIC BUCK/BOOST MODE SELECTION SYSTEM FOR DC-DC CONVERTER

(71) Applicant: Mindspeed Technologies, Inc., Newport Beach, CA (US)

(72) Inventors: Cristiano Bazzani, Irvine, CA (US); Fabio Gozzini, Campbell, CA (US)

(73) Assignee: M/A-COM Technology Solutions Holdings, Inc., Lowell, MA (US)

( * ) Notice: Subject to any disclaimer, the term of this patent is extended or adjusted under 35 U.S.C. 154(b) by 187 days.

(21) Appl. No.: 14/094,785

(22) Filed: Dec. 2, 2013

(65) Prior Publication Data

US 2014/0152272 A1    Jun. 5, 2014

Related U.S. Application Data

(60) Provisional application No. 61/732,884, filed on Dec. 3, 2012.

(51) Int. Cl.
*H02M 3/158*    (2006.01)
(52) U.S. Cl.
CPC .................................. *H02M 3/1582* (2013.01)
(58) Field of Classification Search
CPC ... H02M 3/156; H02M 3/158; H02M 3/1582; H02M 3/1588; Y02B 70/1466; G01R 19/0084; G05F 1/62
USPC .......... 323/225, 234, 259, 271, 272, 282, 285
See application file for complete search history.

(56) References Cited

U.S. PATENT DOCUMENTS

| | | | |
|---|---|---|---|
| 4,534,064 A | 8/1985 | Giacometti et al. |
| 4,545,078 A | 10/1985 | Wiedeburg |
| 4,687,924 A | 8/1987 | Galvin et al. |

(Continued)

FOREIGN PATENT DOCUMENTS

| | | |
|---|---|---|
| EP | 1471671 | 12/2004 |
| EP | 1852960 | 11/2007 |

(Continued)

OTHER PUBLICATIONS

Jamie Bailey "How DVD Works", http://sweb.uky.edu/~jrbai101/dvd.htm, May 1, 1999, pages.

(Continued)

*Primary Examiner* — Yemane Mehari
(74) *Attorney, Agent, or Firm* — Weide & Miller, Ltd.

(57) ABSTRACT

A reconfigurable DC-DC converter including a controller is disclosed which automatically adjusts the mode of operation (buck mode or boost mode) depending on the system requirements and is able to achieve the maximum efficiency and the lowest inductance current. The method of switching between buck and boost mode allows the converter to operate to 100% duty cycle for buck mode and 0% duty cycle for boost mode. This maximizes efficiency since the buck-boost mode of operation is eliminated and improves the stability and reliability of the system. A converter output voltage is processed and compared to a control voltage to generate buck and boost comparator output signals. The buck and boost comparator output signals are provided to control logic, which generates switch control signals, which are provided to the DC-DC converter to establish buck mode, boost mode, or pass-through mode.

20 Claims, 6 Drawing Sheets

(56) References Cited

U.S. PATENT DOCUMENTS

| | | |
|---|---|---|
| 4,734,914 A | 3/1988 | Yoshikawa |
| 4,747,091 A | 5/1988 | Doi |
| 4,864,649 A | 9/1989 | Tajima et al. |
| 5,019,769 A | 5/1991 | Levinson |
| 5,039,194 A | 8/1991 | Block et al. |
| 5,047,835 A | 9/1991 | Chang |
| 5,057,932 A | 10/1991 | Lang |
| 5,334,826 A | 8/1994 | Sato et al. |
| 5,383,046 A | 1/1995 | Tomofuji et al. |
| 5,383,208 A | 1/1995 | Queniat et al. |
| 5,392,273 A | 2/1995 | Masaki et al. |
| 5,394,416 A | 2/1995 | Ries |
| 5,396,059 A | 3/1995 | Yeates |
| 5,448,629 A | 9/1995 | Bosch et al. |
| 5,471,501 A | 11/1995 | Parr et al. |
| 5,488,627 A | 1/1996 | Hardin et al. |
| 5,510,924 A | 4/1996 | Terui et al. |
| 5,532,471 A | 7/1996 | Khorramabadi et al. |
| 5,557,437 A | 9/1996 | Sakai et al. |
| 5,574,435 A | 11/1996 | Mochizuki et al. |
| 5,594,748 A | 1/1997 | Jabr |
| 5,636,254 A | 6/1997 | Hase et al. |
| 5,673,282 A | 9/1997 | Wurst |
| 5,710,660 A | 1/1998 | Yamamoto et al. |
| 5,812,572 A | 9/1998 | King et al. |
| 5,822,099 A | 10/1998 | Takamatsu |
| 5,844,928 A | 12/1998 | Shastri et al. |
| 5,900,959 A | 5/1999 | Noda et al. |
| 5,926,303 A | 7/1999 | Giebel et al. |
| 5,943,152 A | 8/1999 | Mizrahi et al. |
| 5,953,690 A | 9/1999 | Lemon et al. |
| 5,956,168 A | 9/1999 | Levinson et al. |
| 5,978,393 A | 11/1999 | Feldman et al. |
| 6,010,538 A | 1/2000 | Sun et al. |
| 6,014,241 A | 1/2000 | Winter et al. |
| 6,020,593 A | 2/2000 | Chow et al. |
| 6,021,947 A | 2/2000 | Swartz |
| 6,023,147 A | 2/2000 | Cargin, Jr. et al. |
| 6,049,413 A | 4/2000 | Taylor et al. |
| 6,064,501 A | 5/2000 | Roberts et al. |
| 6,107,847 A * | 8/2000 | Johnson ............ H03K 3/356008 327/143 |
| 6,108,113 A | 8/2000 | Fee |
| 6,111,687 A | 8/2000 | Tammela |
| 6,115,113 A | 9/2000 | Flockencier |
| H1881 H | 10/2000 | Davis et al. |
| 6,160,647 A | 12/2000 | Gilliland et al. |
| 6,166,527 A * | 12/2000 | Dwelley ............... H02M 3/1582 323/222 |
| 6,175,434 B1 | 1/2001 | Feng |
| 6,215,286 B1 | 4/2001 | Scoones et al. |
| 6,259,293 B1 | 7/2001 | Hayase et al. |
| 6,262,781 B1 | 7/2001 | Deter |
| 6,275,016 B1 | 8/2001 | Ivanov |
| 6,282,017 B1 | 8/2001 | Kinoshita |
| 6,292,497 B1 | 9/2001 | Nakano |
| 6,366,373 B1 | 4/2002 | MacKinnon et al. |
| 6,423,963 B1 | 7/2002 | Wu |
| 6,452,719 B2 | 9/2002 | Kinoshita |
| 6,473,224 B2 | 10/2002 | Dugan et al. |
| 6,494,370 B1 | 12/2002 | Sanchez |
| 6,512,617 B1 | 1/2003 | Tanji et al. |
| 6,535,187 B1 | 3/2003 | Wood |
| 6,556,601 B2 | 4/2003 | Nagata |
| 6,570,944 B2 | 5/2003 | Best et al. |
| 6,580,328 B2 | 6/2003 | Tan et al. |
| 6,661,940 B2 | 12/2003 | Kim |
| 6,704,008 B2 | 3/2004 | Naito et al. |
| 6,707,600 B1 | 3/2004 | Dijaili et al. |
| 6,720,826 B2 | 4/2004 | Yoon |
| 6,740,864 B1 | 5/2004 | Dries |
| 6,801,555 B1 | 10/2004 | Dijaili et al. |
| 6,828,857 B2 | 12/2004 | Paillet et al. |
| 6,836,493 B2 | 12/2004 | Mahowald et al. |
| 6,837,625 B2 | 1/2005 | Schott et al. |
| 6,852,966 B1 | 2/2005 | Douma et al. |
| 6,862,047 B2 | 3/2005 | Hibi |
| 6,864,751 B1 | 3/2005 | Schmidt et al. |
| 6,868,104 B2 | 3/2005 | Stewart et al. |
| 6,879,217 B2 | 4/2005 | Visocchi |
| 6,888,123 B2 | 5/2005 | Douma et al. |
| 6,909,731 B2 | 6/2005 | Lu |
| 6,934,307 B2 | 8/2005 | DeCustatis et al. |
| 6,934,479 B2 | 8/2005 | Sakamoto et al. |
| 6,941,077 B2 | 9/2005 | Aronson et al. |
| 6,952,531 B2 | 10/2005 | Aronson et al. |
| 6,956,643 B2 | 10/2005 | Farr et al. |
| 6,957,021 B2 | 10/2005 | Aronson et al. |
| 6,967,320 B2 | 11/2005 | Chieng et al. |
| 7,031,574 B2 | 4/2006 | Huang et al. |
| 7,039,082 B2 | 5/2006 | Stewart et al. |
| 7,046,721 B2 | 5/2006 | Grohn |
| 7,049,759 B2 | 5/2006 | Roach |
| 7,050,720 B2 | 5/2006 | Aronson et al. |
| 7,058,310 B2 | 6/2006 | Aronson et al. |
| 7,066,746 B1 | 6/2006 | Togami et al. |
| 7,079,775 B2 | 7/2006 | Aronson et al. |
| 7,184,671 B2 | 2/2007 | Wang |
| 7,193,957 B2 | 3/2007 | Masui et al. |
| 7,206,023 B2 | 4/2007 | Belliveau |
| 7,215,891 B1 | 5/2007 | Chiang et al. |
| 7,265,334 B2 | 9/2007 | Draper et al. |
| 7,276,682 B2 | 10/2007 | Draper et al. |
| 7,357,513 B2 | 4/2008 | Watson et al. |
| 7,381,935 B2 | 6/2008 | Sada et al. |
| 7,453,475 B2 | 11/2008 | Nitta et al. |
| 7,492,135 B2 | 2/2009 | Saeki et al. |
| 7,504,610 B2 | 3/2009 | Draper |
| 7,692,417 B2 | 4/2010 | Dagher |
| 7,737,668 B2 * | 6/2010 | Oswald ............... H02M 3/1582 323/259 |
| 7,777,457 B2 | 8/2010 | Haiplik |
| 8,080,988 B2 | 12/2011 | Hurtz et al. |
| 8,319,484 B2 | 11/2012 | Houston |
| 8,564,991 B2 * | 10/2013 | Zhang ................. H02M 1/4225 323/259 |
| 2001/0046243 A1 | 11/2001 | Schie |
| 2002/0015305 A1 | 2/2002 | Bornhorst et al. |
| 2002/0105493 A1 | 8/2002 | Chin et al. |
| 2002/0130977 A1 | 9/2002 | Hibi |
| 2003/0030756 A1 | 2/2003 | Kane et al. |
| 2003/0053003 A1 | 3/2003 | Nishi et al. |
| 2004/0032890 A1 | 2/2004 | Murata |
| 2004/0047635 A1 | 3/2004 | Aronson et al. |
| 2004/0095976 A1 | 5/2004 | Bowler et al. |
| 2004/0136727 A1 | 7/2004 | Androni et al. |
| 2004/0202215 A1 | 10/2004 | Fairgrieve |
| 2004/0240041 A1 | 12/2004 | Tian et al. |
| 2005/0180280 A1 | 8/2005 | Hoshino et al. |
| 2005/0185149 A1 | 8/2005 | Lurkens et al. |
| 2005/0215090 A1 | 9/2005 | Harwood |
| 2006/0114954 A1 | 6/2006 | Wong et al. |
| 2006/0192899 A1 | 8/2006 | Ogita |
| 2007/0058089 A1 | 3/2007 | Wang |
| 2007/0081130 A1 | 4/2007 | May et al. |
| 2007/0114951 A1 | 5/2007 | Tsen et al. |
| 2007/0159434 A1 | 7/2007 | Yen et al. |
| 2007/0195208 A1 | 8/2007 | Miyazawa et al. |
| 2007/0229718 A1 | 10/2007 | Hall |
| 2007/0286609 A1 | 12/2007 | Ikram et al. |
| 2008/0012508 A1 | 1/2008 | Steele et al. |
| 2008/0024469 A1 | 1/2008 | Damera-Venkata et al. |
| 2008/0074562 A1 | 3/2008 | Endo et al. |
| 2008/0231209 A1 | 9/2008 | Shiwaya et al. |
| 2008/0246893 A1 | 10/2008 | Boss et al. |
| 2008/0303499 A1 | 12/2008 | Chen et al. |
| 2008/0309407 A1 | 12/2008 | Nakamura et al. |
| 2010/0045254 A1 | 2/2010 | Grant |
| 2010/0164396 A1 | 7/2010 | Lindeberg et al. |
| 2010/0264847 A1 | 10/2010 | Chen et al. |
| 2011/0001462 A1 | 1/2011 | Couleur et al. |
| 2011/0062874 A1 | 3/2011 | Knapp |
| 2011/0156683 A1 | 6/2011 | Zhang et al. |
| 2011/0187336 A1 | 8/2011 | Wu et al. |

(56) References Cited

U.S. PATENT DOCUMENTS

| | | |
|---|---|---|
| 2011/0241636 A1 | 10/2011 | Wu et al. |
| 2012/0181939 A1 | 7/2012 | Szczeszynski et al. |
| 2013/0313996 A1 | 11/2013 | Williams |

FOREIGN PATENT DOCUMENTS

| | | |
|---|---|---|
| JP | 10-243642 | 9/1998 |
| JP | 2004045989 | 2/2004 |
| WO | WO 93/21706 | 10/1993 |
| WO | WO 02/063800 | 8/2002 |
| WO | WO 2004/098100 | 11/2004 |
| WO | 2008-132551 | 11/2008 |

OTHER PUBLICATIONS

Tuan "Solace" Nguyen, "CD, CD-R, CD-RW, DVD, DD-RAM, DVD-RW, and MO", Tweak3D.Net-Your Freakin' Tweakin Source!, http://www.tweak3d.net/articles/opticals/, May 13, 2000, 7 pages.

"An Introduction to DVD-RW", DVD White Paper, Pioneer New Media Technologies, Inc., Feb. 8, 2001, 8 pages.

Richard Wilkinson "Topic: Selecting the Right DVD Mastering Technique", DVD Technology Update, http://www.optical-disc.com/dvdupdate.html, 2002, 8 pages.

Dr. John Rilum, "Mastering Beyond DVD Density", http://www.optical-disc.com/beyonddvd.html, 2002, 7 pages.

"CD Basics: The Bumps", Howstuffworks "How CD Burners Work", http://entertainment.howstuffworks.com/cd-burner1.htm, 2004, 3 pages.

Keith Szolusha, "Linear Technology Design Notes DC/DC Converter Drives Lumileds White LEDs from a Variety of Power Sources-Design Note 340", Linear Technology Corporation, © Linear Technology Corporation 2004, date unknown, 2 pages.

"An Introduction to DVD Recordable (DVD-R) What is DVD Recordable?" http://www.dvd-copy.com/reference/dvd_recordable.html, 2004, 8 pages.

"Power Management, LED—driver considerations" Analog and Mixed-Signal Products, Analog Applications Journal, www.ti.com/sc/analogapps, Texas Instruments Incorporated, © 2005 Texas Instruments Incorporated, Michael Day, 5 pages.

"Linear Technology LCT 3533 2A Wide Input Voltage Synchronous Buck-Boost DC/DC Converter", © Linear Technology Corporation 2007, 16 pages.

"National Semiconductor LM 3549 High Power Sequential LED Driver", © 2010 National Semiconductor Corporation, www.national.com, Aug. 3, 2010, 20 pages.

"TPS63020 TPS63021 High Efficiency Single Inductor Buck-Boost Converter With 4-A Switches", Texas Instruments, Copyright © 2010, Texas Instruments Incorporated, Apr. 2010, 28 pages.

Ping Ching Huang, et al. "Hybrid Buck-Boost Feedforward and Reduced Average Inductor Current Technigques in Fast Line Transient and High-Efficiency Buck-Boost Converter", IEEE Transaction on Power Electronics, vol. 25 No. 3, Mar. 2010 © 2010 IEEE, 12 pages.

* cited by examiner

| MODE | A | B | C | D |
|---|---|---|---|---|
| Buck | PWM_buck | Inverted PWM_buck | ON | OFF |
| Boost | ON | OFF | PWM_boost | Inverted PWM_boost |
| Passthrough | ON | OFF | ON | OFF |

AUTOMATIC BUCK/BOOST MODE SELECTION SYSTEM FOR DC-DC CONVERTER

PRIORITY CLAIM

If the voltage required the voltage required This application claims priority to and the benefit of U.S. Provisional Patent Application 61/732,884 filed on Dec. 3, 2012 and entitled Automatic Buck/Boost Mode Selection System for DC-DC Converter.

FIELD OF THE INVENTION

The invention relates to DC-DC converter and in particular to a system that adjusts the mode of operation (buck mode or boost mode) depending on the system requirements to achieve the maximum efficiency.

BACKGROUND

Batteries are the most common method to power portable systems. One popular type of battery is a lithium-ion battery. Such batteries have a wide voltage variation, from 4.2V when it is fully charged down to 2.7V when almost completely discharged. Therefore, in order to maintain high efficiency for power usage in a battery powered device, a switching DC-DC converter is used to convert the battery voltage level to the voltage level required by the circuit.

If the voltage required is always below or above the battery range than a buck or boost converter can easily carry-out this task, but in many applications the voltage required is in the middle of the range such that the voltage can not be supplied in either boost only mode or buck only mode. For this case a classic buck-boost converter design with 4 switches (two at the input for the buck and two at the output for the boost) that toggle all the time would be a well-known design choice. However, this configuration is very inefficient since the power consumed to drive the switches is at least twice that as when in boost only or buck only mode. The average current in the inductor would be much higher, when compared to a buck or boost only solution. Moreover, for the same reason the inductor required in the DC-DC converter would be larger, more expensive, and require higher saturation current Numerous prior art systems have been proposed to improve the performance of buck-boost DC-DC converters. Mostly commonly such proposals have been focused on the three different modes (buck, buck-boost and boost) depending on the input/output voltage trying to minimize as much as possible the duration or amount of time spent in buck-boost mode, which is very inefficient. However, the mixed buck-boost mode usually cannot be avoided because there is a limitation on the maximum achievable duty cycle (typically 90%) making it impossible to transition directly from buck mode to boost mode. Moreover, this limitation introduces an additional problem because it is important to accurately match the two transition points for buck mode to buck-boost mode and from buck-boost mode to boost mode. Considering the process variation and inaccuracy during manufacture, it is difficult to establish this accuracy between transition points and such attempts can be very complicated and result in instability.

The only solution that can completely avoid the buck-boost mode was a current mode DC-DC converter, in this case it is possible to achieve good performances but at the cost of complex additional analog circuitry to accurately measure the current in the inductance. This complexity is a drawback to the prior art because it adds costs and may reduce reliability.

The following describe related prior art attempts at addressing the drawbacks of the prior art.

Current Feedback Buck-Boost Solutions without 4 Switches:
1) U.S. Pat. No. 6,275,016 Buck-Boost Switching Regulator
2) U.S. Publication No. 2011/0156683 Current Mode Buck-Boost DC-DC Controller
3) U.S. Publication No. 2011/0187336 Non-Inverting Buck-Boost Voltage Converter Buck-Boost Converter Solutions with 4 Switches:
4) The LTC3533—2A Wide Input Voltage Synchronous Buck-Boost DC/DC Converter
5) U.S. Pat. No. 7,737,668—Buck Boost Switching Regulator
6) U.S. Pat. No. 7,777,457—Constant Frequency Current-Mode Buck-Boost Converter With Reduced Current Sensing
7) U.S. Publication No. 2010/0045254—Average Current Mode Controlled Converter Having A Buck Mode, A Boost Mode And A Partial 4 Switch Mode To overcome the drawbacks in the prior art, an improved DC-DC controller is disclosed.

SUMMARY

A dynamic DC-DC converter is disclosed which automatically adjusts the mode of operation (buck mode or boost mode) depending on the system requirements and therefore achieve the maximum efficiency and the lowest inductance current. The method of switching between buck and boost mode which is disclosed allows the converter to operate to 100% duty cycle for buck mode and 0% duty cycle for boost mode. Based on output voltage, operational mode is selected based on processing by one or more comparators, signal generators and control logic. Efficiency is maximized since the buck-boost mode of operation is eliminated which improves the stability and therefore reliability of the system since the converter transitioning from buck to boost and vice-versa does not present discontinuities.

In one configuration a control system for a DC-DC converter is disclosed comprising a first integrator configured to process a first current signal and a reference voltage. Also provided is a first switch controlled by an integrator reset signal such that the first switch is configured to selectively reset the first integrator to cause the first integrator to output a first sawtooth wave form signal. A first comparator is configure to compare the first sawtooth wave form signal to a control voltage to generate a buck set signal. Similarly, a second integrator is provided and configured to process a second current signal and the reference voltage. A second switch is provided and controlled by the integrator reset signal such that the second switch configured to selectively reset the second integrator to cause the second integrator to output a second sawtooth wave form signal. A second comparator is configured to compare the second sawtooth wave form signal to the control voltage to generate a boost set signal. Also part of this embodiment is a controller configured to receive and process the buck set signal and the boost set signal to generate DC-DC converter control signals which establish the DC-DC converter in buck mode or boost mode, such that buck mode includes a 100% duty cycle and boost mode includes 0% duty cycle.

In one embodiment the controller includes at least one buck flip flop configured to receive the buck set signal and responsive to the buck set signal output a buck mode control signal and at least one boost flip flop configured to receive the boost set signal and responsive to the boost set signal output a boost mode control signal. It is contemplated that the controller is further configured to generate one or more switch control signals, the switch control signals establishing DC-DC converter in buck mode, boost mode, or a pass-through mode. In one embodiment, the controller is further configured to establish the DC-DC converter in a pass-through mode, the pass-through mode being selected by the controller when the DC-DC converter input voltage is generally equal to the DC-DC converter output voltage.

In one variation, the system further comprises a buck flip flop configured to receive the buck set signal and responsive to the buck set signal output a buck mode control signal. Likewise, the system may also further comprise a boost flip flop configured to receive the boost set signal and responsive to the boost set signal output a boost mode control signal. In one embodiment the system further comprises control logic configured to process the buck mode control signal and the boost mode control signal to create DC-DC converter control signal. It is possible that the system may also include a delay configured to delay a reset signal, the reset signal provided to flip flop. The control voltage may be generated by an error amplifier. In one embodiment the first integrator comprises a capacitor in parallel with a comparator. The integrator reset signal may be a pulse width modulated signal.

Also disclosed is a DC-DC converter controller including various elements such as a switch module configured to receive an input voltage and one or more switch control signals and output of output voltage. Also part of the controller is at least one signal generator configured to generate one or more time varying signals and an error signal generator configured to compare the output voltage to a reference voltage and generate a control signal. A pulse generator is present and configured processes the one or more time varying signals and the control voltage to generate a boost mode signal and a buck mode signal such that the boost mode signal and a buck mode signal are configured to control the switch module to establish the output voltage.

The controller may further comprise a logic unit configured to receive and processes the boost mode signal and a buck mode signal to generate switch control signals such that the switch control signals are provided to the switch module to control a position of one or more switches in the switch module. In one embodiment, the switch module includes an inductor and is configured as a DC-DC converter. The at least one signal generator configured to generate one or more time varying signal may comprise a sawtooth generator configured to generate at one or more sawtooth signals. In one configuration the pulse generator is a pulse width modulated signal generator. The error signal generator may comprise a comparator. The controller may include a delay in the pulse generator to prevent false triggers from the one or more time varying signals which could change a mode of the DC-DC converter between a buck mode or boost mode.

A DC-DC converter with controller is also disclosed and described below which includes a DC-DC converter configured to convert an input voltage to an output voltage based on switch control signals. A pulse generator is configured to process a time varying signal and an error signal to generate a boost mode signal and a buck mode signal The error signal is based on the output voltage. Control logic is provide and configured to process the boost mode signal, the buck mode signal, or both, to generate the switch control signals, which control switches in the DC-DC converter.

In one embodiment the DC-DC converter further comprises at least one sawtooth signal generator configured to generate at least one sawtooth signal. The pulse generator may comprise a pulse width modulated generator configured to output a pulse width modulated boost signal and a pulse width modulated buck signal. Also part of the DC-DC converter may be a comparator configured to compare the output voltage to a reference voltage to generate the error signal. The DC-DC converter may further include a delay to prevent false triggers by the time varying signal to change from modes between buck mode or boost mode of the DC-DC converter.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

To overcome the drawbacks in the prior art and provide additional benefits, a new solution is presented to design a reconfigurable DC-DC converter which automatically adjusts the mode of operation (buck mode or boost mode) depending on the system requirements and therefore achieve the maximum efficiency and the lowest inductance current. The method of switching between buck and boost mode which is disclosed allows the converter to operate to 100% duty cycle for buck mode and 0% duty cycle for boost mode. This maximizes efficiency since the buck-boost mode of operation is eliminated and improves the stability and therefore reliability of the system since the gain of the converter going from buck to boost and vice-versa does not present discontinuities.

The solution presented allows the DC-DC converter to work up to 100% duty cycle for buck mode and down to 0% duty cycle in boost mode. This achieves maximum efficiency and at the same time improves the reliability of the system. Reliability and stability is improved because the gain of the DC-DC converter going from buck mode to boost mode, and vice versa, is naturally continuous. By reliably and consistently transitioning to and from buck mode and boost mode the system avoids instability, which could cause catastrophic failure.

Moreover a pass-through mode of operation has been introduced to address situations where the input is very close to the output and the decision logic between buck/boost mode may be inaccurate due to errors in the circuits such as offsets, glitches, timing mismatches, signal errors.

Figure 1A:
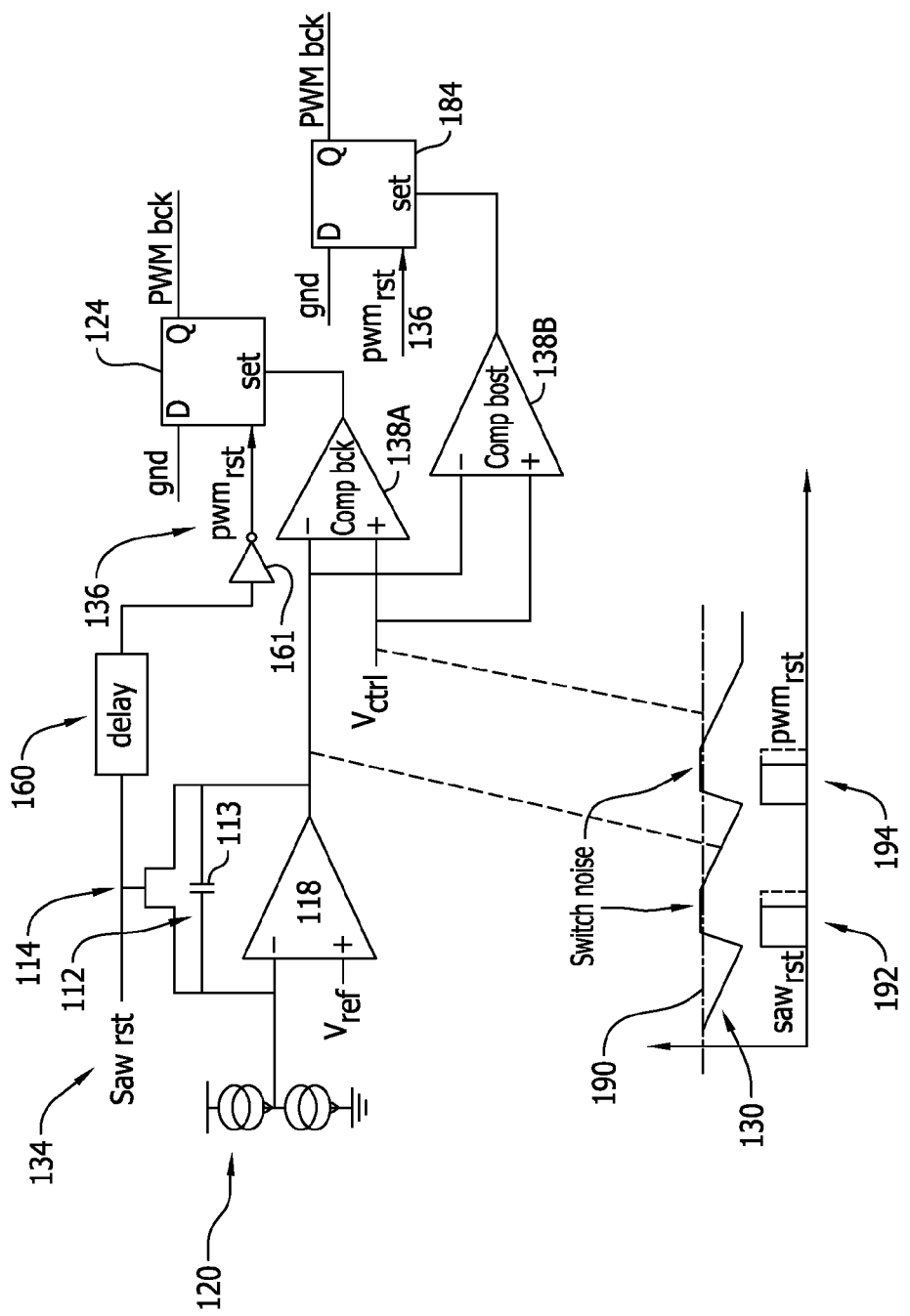
FIG. 1A illustrates an exemplary block diagram of a pulse width modulated signal generator with associated signal plot.
Figure 5:
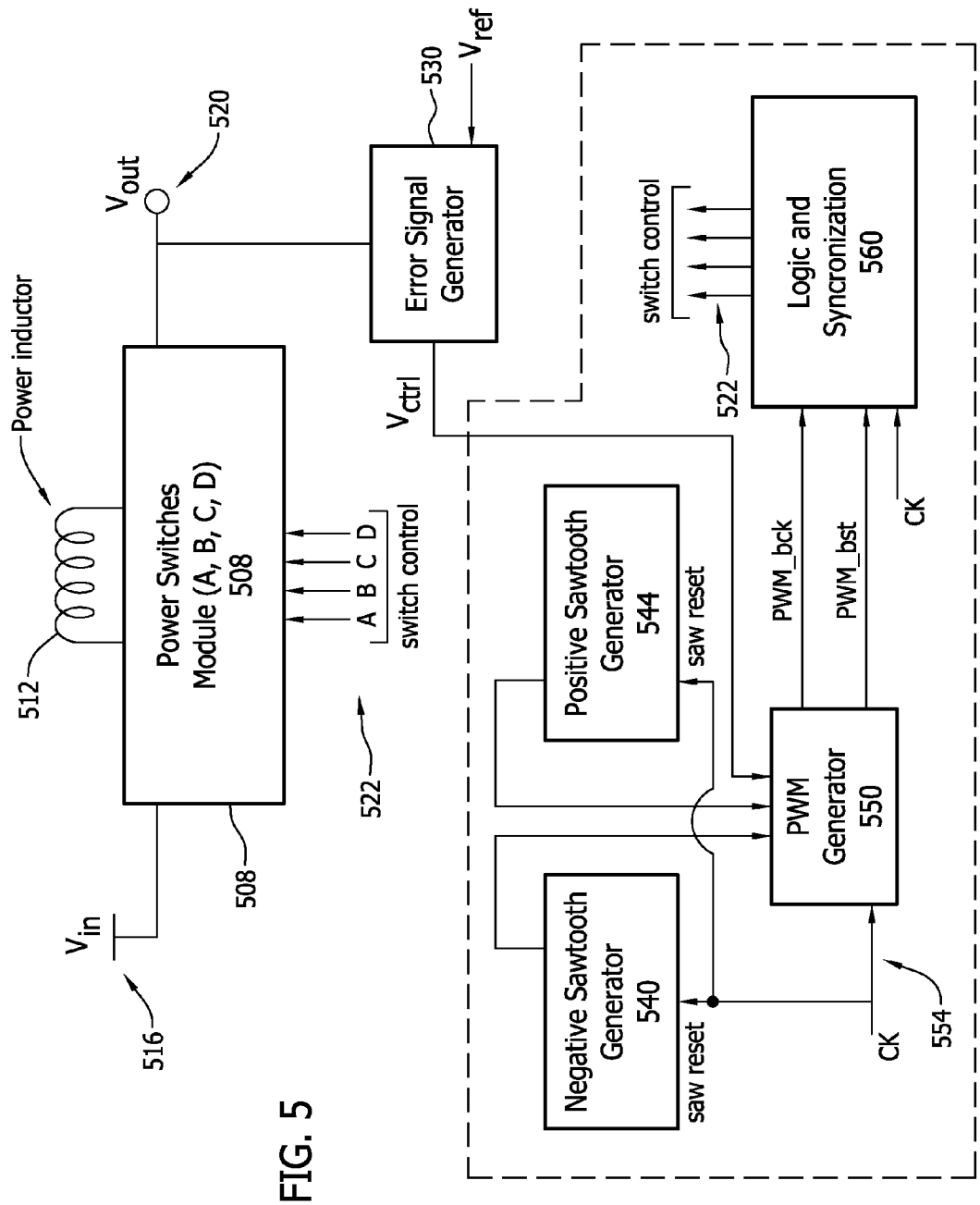
FIG. 5 illustrates a block diagram of an exemplary DC-DC converter controller.

FIG. 1A illustrates an exemplary block diagram of a pulse width modulated signal generator with associated signal plot. In combination, FIG. 1A, FIG. 1B and FIG. 2 generally describe the entire system. FIG. 5 is a high level block diagram. FIG. 3 is an expanded version of certain elements of FIG. 1A.

In FIG. 1A, the PWM generator is shown above the signal plot. In FIG. 1A, an integrator 112 is provided and includes a capacitor 113 as shown. The capacitor 113 is fed with a current from a current source 120 and reset by a switch 114 to thereby generate the sawtooth waveform 130 (or a modified version) that, when compared with the Vctrl signal in the comparator 138A, 138B, generates the required PWM signals for the power switches in the DC-DC converter (not shown). In other embodiments other sawtooth waveform generator may be adopted for use or it is contemplated that other signal waveforms other than a sawtooth waveform may be utilized.

As shown in FIG. 1A, a delay 160 that receives the SAW$_{RST}$ signal 134. The output of the delay 160 feeds into an inverter 161 that outputs a PWM reset signal 136. The PWM reset signal 136 is fed into a flip-flop 124. Although shown as a delay 160, it is possible to use other devices in place of the delay to avoid unwanted triggering of the downstream comparator or flip flop. The delay 160 is an optional implementation detail and may be optionally included.

Also shown in FIG. 1A is a comparator 118 that is part of the integrator 112. The comparer 118 receives as a first input the output of the current source 120 and as a second input the Vref signal. The output of the comparator 118 feeds into a second comparator 138A which also receives the V$_{ctrl}$ signal as a second input. The second comparator 138B may be referred to as the comparator buck. The output of the second comparator 138A provides a signal to the set input of the flip flop 124 (buck flip flop). The buck flip flop 124 also as an input connected to ground while its output is a PWMbck signal, which is discussed below in greater detail.

In this example embodiment also provided is a third comparator 138B (referred to as comparator boost) which, if utilized, receives the output of the first comparator 118 and the V$_{ctrl}$ signal as shown. An output of the third comparator 138B feeds into a set input of a second flip flop 184. The first flip flop 124 may be referred to as a buck flip flop while the second flip flop 184 may be referred to as a boost flip flop. The boost flip flop 184 has the D input tied to ground and also receives the PWMrst signal as an input. The output of the boost flip flop is the PWMbst signal.

In alternative embodiments the comparator may be replaced with or comprise any device capable of processing two or more input signals to generate an output that defines the relationship between the two or more input signals. Any circuit may be used to generate the waveforms as shown and described herein. The basic concept is that those waveforms are utilized to establish continuous and reliable transition from buck to boost without going through buck-boost mode. To those skilled in the art, it will be evident that the components of FIG. 1A describe one possible implementation of a sawtooth generator circuit and controller in accordance with one example embodiment of the invention. Any other sawtooth generator or circuit can be used to create the waveforms.

In relation to the graph that shows signal plots in relation to the signals located at various nodes within the circuit, it is shown that the control signal Vctrl 190 is generally constant as shown or slow varying in relation to the speed of the sawtooth waveform. The sawtooth waveform 130 varies over time in relation to the signal Vctrl 190, SAWrst signal 192, and PWMrst signal 194. As can be seen, plot 190 transitions at the rise and fall of the SAWrst signal 192 and the PWMrst signal 194. In this configuration the maximum value for the sawtooth wave form 130 is the value of Vctrl 190. Switch noise is shown and discussed below.

During operation if the system of FIG. 1, if the PWM reset signal 136 is aligned with the SAWrst signal 136 when the Vctrl signal is at or very close to the top of the sawtooth wave (100% duty cycle), then the switch's charge injection can cause a glitch or a voltage noise. The term glitch or voltage noise may be an anomaly or discontinuity in the sawtooth wave 130 that in turn will trigger the comparator at the wrong time. This would cause the system to transition from buck to boost mode or vice-versa at the wrong time. This could result in the system transitioning to buck or boost mode even though the output voltage is higher or lower respectively then the input voltage. This could in turn lead to instability and additional ripple at the output of the converter.

In this embodiment, the value of the Vref voltage presented to the comparator 118 associated with the integrator 112 is not material to the behavior of the system. It is generally chosen to be half of the DC-DC converter minimum input voltage to allow for maximum dynamic range for the sawtooth waveforms and at the same time be large enough to be greater than the offsets and noise (sources of error) present in the system.

Alternatively, if a delay 160 is introduced between SAWrst signal 134 and PWMrst signal 136, the glitches on the sawtooth wave 130 are ignored by the system and the comparator 138A always has a "clean" sawtooth wave to compare with the Vctrl signal. As discussed above, the delay prevents any anomaly or discontinuity in the sawtooth wave 130 from trigger the comparator or flip flop at the wrong time. The delay prevents spurious signals from causing glitches such as due to switch noise, and prevents the flip-flop from switching prematurely or at an improper time. In the presented implementation of the sawtooth wave generator, the glitch is usually caused by the charge injection of the reset switch closing.

It will be evident to those skilled in the art that the delay addresses an issue of sawtooth generator circuits which would create system level issues for the buck converter. The use of a "glitch-less" sawtooth generator is also possible to overcome the issue however the solution introduced here represent a very low complexity solution and therefore highly desirable. Any other implementation would also be acceptable in the framework of the invention.

Also shown in FIG. 1A is circuitry 138B, 184 which creates a second sawtooth and a second PWM signal (PWMbst), in the same general manner as discussed above for elements 138A, 124 and the boost mode PWM signal that is output from flip flop 124.

Figure 1B:
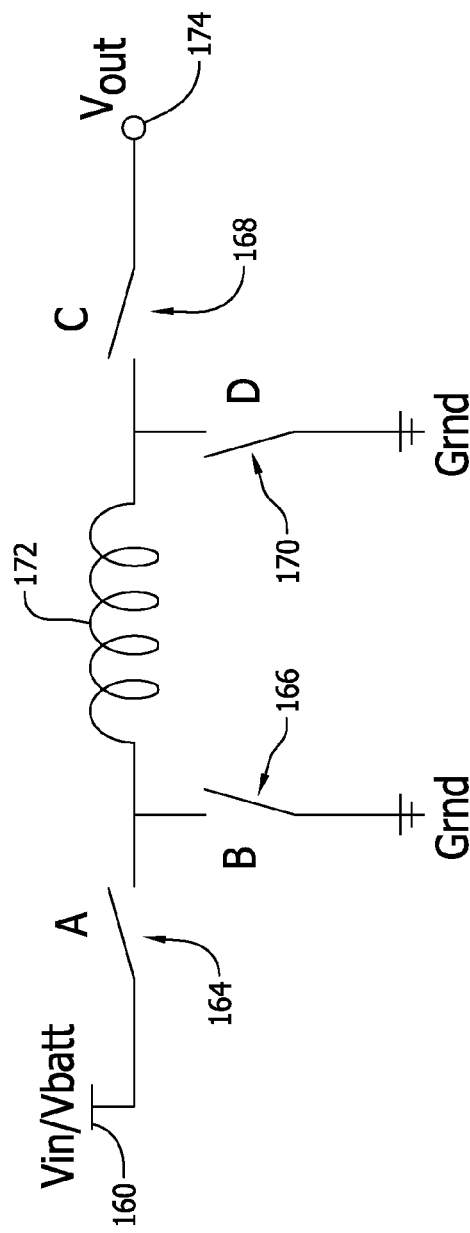
FIG. 1B a generalized DC-DC converter with switch operation table based on PWM signal.

FIG. 1B a generalized DC-DC converter is shown with switch operation table based on the PWM signal. In this simplified embodiment provided for purposes of discussion, not all elements are shown. In addition, shown elements may be replaced with different elements. In this configuration, an input voltage Vin/Vbatt 160 connects to a switch A 164. The opposite terminal of switch A 164 connect to a switch B 166 and an inductor 172. The opposing terminal of switch B 166 connects to ground. The opposing terminal of the inductor 172 connects to both a switch C 168 and a switch D 170 as shown. The opposing terminal of switch D 168 connects to an output node Vout 174. The opposing terminal of the switch 170 connects to ground. Although not shown, each of the switches 164, 166, 168, 170 includes a switch control mechanism which is responsive to a switch control signal. The switch control signal controls operation and position of each switch. The control signals are based on the output for the circuit in FIG. 1A, namely PWMbck and PWMbst.

As shown, switches A, B, C, and D may be individually controlled (opened/closed) according to the chart 176 as shown. The first column of the chart defines the mode of operation which may be buck mode, boost mode, or pass-through mode. The second column is the condition of switch A. Hence, during buck mode, switch A is controlled by the PWMbck signal while during boost mode and pass-through mode switch A is 'on' which in this embodiment is closed. The chart also defines the operation of the other switches. For example, during buck mode, switch B is controlled by an inverted PWM-buck signal, while switches C, D are set on and off respectively. On indicates the switch is closed (conducting) while off indicates the switch is open (not conducting). The switches C & D, when in buck mode, may be controlled by logic or other control system to be in the state shown. A logic table or state machine may set the switch positions such that for example, when in buck mode, switch C is on (closed) and switch D is off (open). These switches maintain this state during the time that that particular mode (in this example, buck mode) is active and enabled and thus are closed or open all the time when in the particular mode shown in the state table 176. These switches thus do not pulse according to the PWM signal.

The MODE column terms buck may also be referred to as Buck Enable and Boost may also be referred to as Boost Enable. In relation to FIG. 1A, the PWM_buck is the output of flip flop 124 while PWM_boost is the output of flip flop 184. The mode is determined by the $bck_{en}$ and $bst_{en}$ signals in FIG. 2.

Pass-through mode is shown at the bottom of the chart 176. Pass-through mode is enabled when the input is approximately equal to the output. In pass-through mode the input is connected to the output through the inductor. This may occur when buck enable and boost enable signal are high at the same time, which may happen because of offset in the comparators or timing mismatches in the logic. Thus, the output of the flip flop 240 may be unknown. Thus, use the buck enable and boost enable signal to determine mode as these signal may be more reliable, but if these signals are both high, then pass-through mode is enabled. The output of flip flop 240 may be an auxiliary output but may or may not be used. Pass-through mode is established by opening switches B and D while closing switches A and D. Pass-through mode is established both the buck enable signal and the boost enable signal (outputs of flip flops 124, 184) are both high. If this occurs, it is an indication that the requested output voltage is generally identical to the input voltage and thus, connection the input 160 to the output 174 is appropriate.

Figure 2:
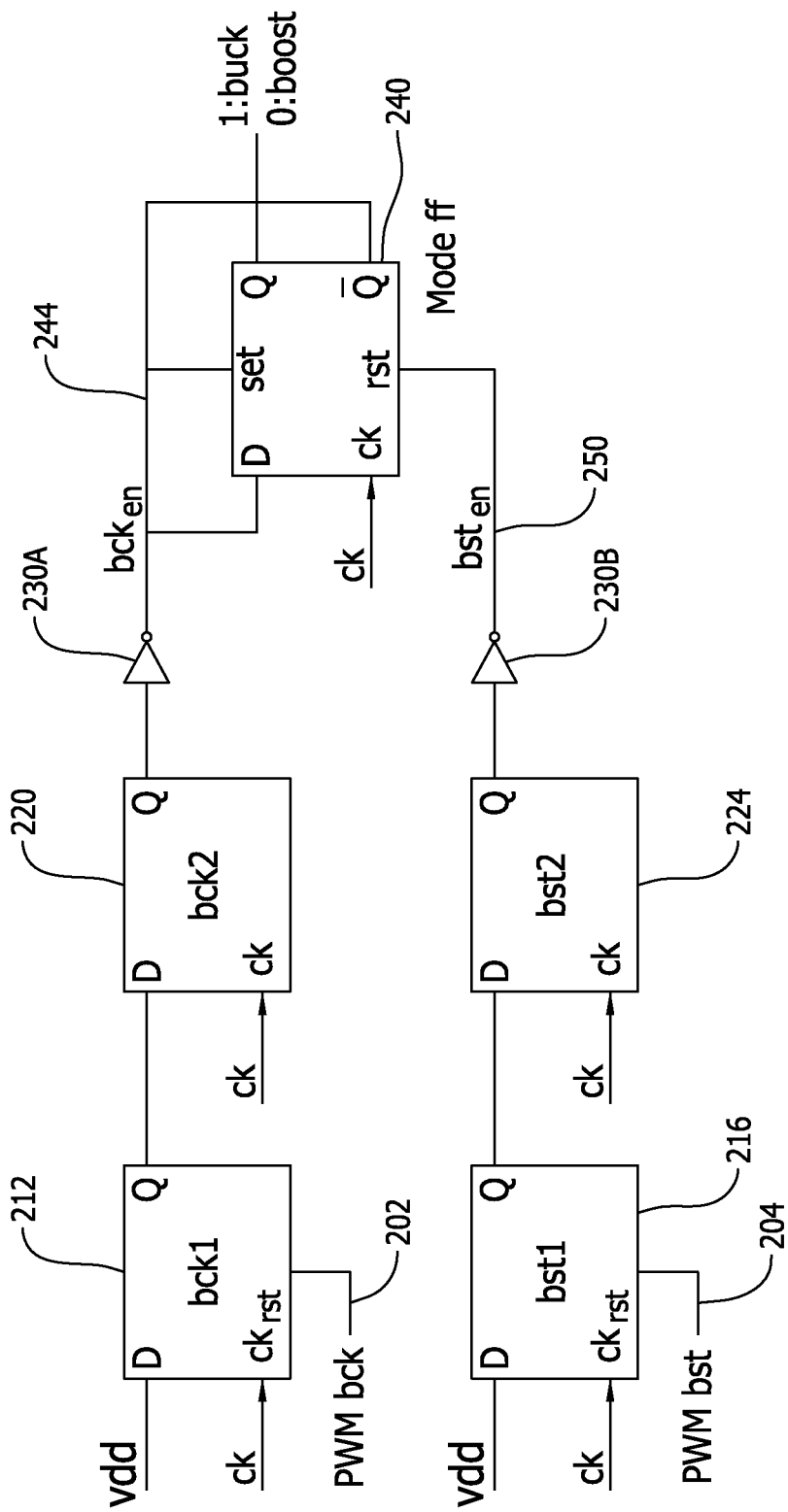
FIG. 2 illustrates a block diagram of an exemplary logic circuit capable of selecting between buck mode or boost mode.
Figure 3:
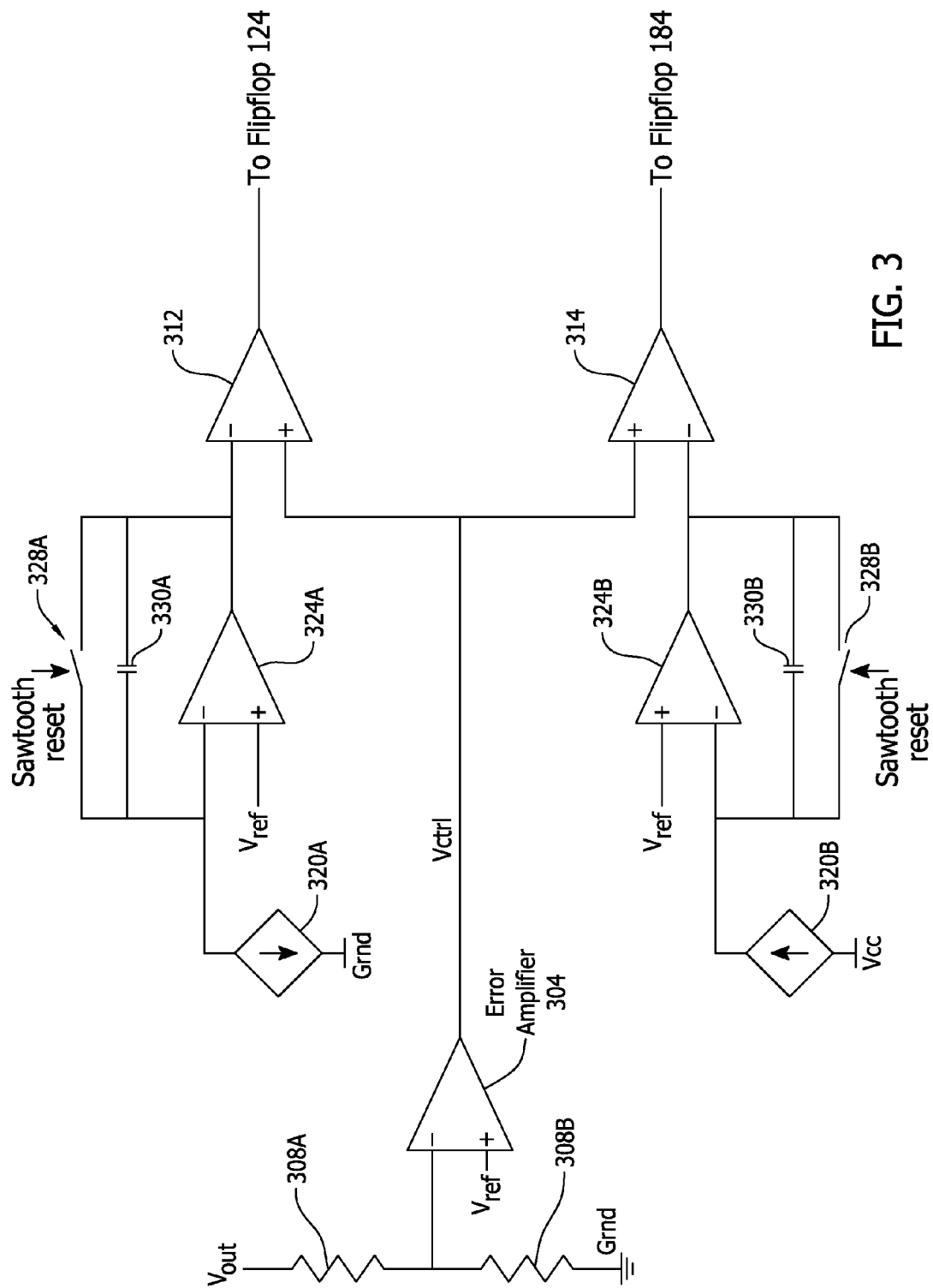
FIG. 3 illustrates an exemplary block diagram of a pulse width modulated signal generator with full circuitry shown for both the buck mode and boost mode.

FIG. 2 illustrates a block diagram of an exemplary logic circuit capable of selecting between buck mode or boost mode. The circuit of FIG. 2 is but one possible logic circuit that may be configured to select among buck mode or boost mode. The system of FIG. 2 may be generalized as logic or a state machine or table that generates an output based on the shown inputs that reflects the table data of FIG. 1B.

As shown, a buck 1 flip-flop 212 received a clock signal and a power supply Vdd (logic one) signal as shown. The buck 1 flip-flop 212 also receives a PWM buck signal input as a reset signal. This signal is provided from the outputs of FIG. 1A. The Q output of flip-flop 212 is presented as an input to a buck 2 flip-flop 220. The buck 2 Flip-flop 220 also receives a clock signal and generates an output which is presented to an inverter 230A. The output of the inverter is the inverted buck signal $bck_{en}$.

A generally similar configuration is also shown for the flip-flop 216 which receives a PWM boost reset signal and the subsequent flip-flop 224. The PWM boost reset signal is provided from the output of the circuit of FIG. 1A. The output of the flip-flop 224 is presented to inverter 230B. The output of the inverter 230B is the $bst_{en}$ signal.

The output of the inverters 230A, 230B are signals $bck_{en}$, 244, and $bst_{en}$ 250 which connect to a flip-flop 240 as set and reset signals as shown. A clock signal is also presented to the flip-flop 240. An inverted Q output is routed back to the D input of the flip-flop 240 while the Q output is the control signal such that a 1 output (logic high) establishes buck mode while a 0 output establishes boost mode. The output signals $bck_{en}$ 244, and $bst_{en}$ 250 control the mode of operation of the DC-DC converter and the switch positions shown in FIG. 1B.

In operation, if the converter is working in buck mode, a PWMbck signal on input 212 will be presented to the reset input of flip-flop 212 to thereby reset the flip-flop every clock cycle. The term signal and wave are used interchangeably herein. This resets the flip-flop bck1 212. As a result, the output of the not gate 230A will provide a constant high bck_en (buck enable) signal on path 244 to the set input of the flip-flop 240.

During this mode of operation, there is not a PWMbst signal 204 at the reset input of bst flip flop 216, and thus the $bst_{en}$ (boost enable) signal on line 250 is low. If the buck mode is not supplying sufficient power, then the Vctrl (generated by the error amplifier 304 of FIG. 3) will increase in magnitude until the Vctrl value is larger than the buck sawtooth wave value. At that point, when the Vctrl value (see FIG. 1) is larger than the buck sawtooth wave value, the PWMbck signal is constantly low (100%) and after 1 clock cycle the $bck_{en}$ (buck enable) signal on line 244 will go low or to a logic zero value.

At this stage in the process, both $bck_{en}$ signal (path 244) and $bst_{en}$ signal (path 250) are low and therefore the mode flip-flop 240 is neither forced to set nor reset and as a result, every clock cycle the mode flip-flop 240 will change its state. However, as soon as the boost mode is activated, meaning the mode flip-flop 240 output is 0 or low value, the boost sawtooth wave value will cross the Vctrl wave value and generate the PWMbst signal. This locks the DC-DC converter in boost mode.

A further benefit to the embodiment shown in FIG. 2 is that the flip-flop stages 212, 220 and 216, 224 further reduce glitching and spurious mode transitions. These are all driven by a clock and within a clock cycle it is preferred that the mode not change. Therefore, it is preferred to only reset the mode in a synchronous manner with the clock. These flip-flop stages synchronize the mode change with the clock signal.

If the Vctrl signal was exactly at the middle point the system would continuously toggle from buck to boost but, because both the PWM signal (PWMbck and PWMbst) are set at high logic level and both the power switches will be constantly on, this allows the current from the source to go directly from the input to the output, through the DC-DC converter inductor (inductance) without any switching. This may be referred to as pass-through mode such that Vin is shorted to Vout through the inductor (which appears as a short to a DC signal).

In relation to FIG. 2 and FIG. 1B, the buck or boost signal output is the control for the switches A, B, C, D. Control for the switches A, B, C, D comes from the outputs form FIG. 1A and the information from the flip flop (240, or 220, 224) in FIG. 2. Output of FIG. 2 determines whether the system is in buck mode or boost mode. When in buck mode, the switch are set as shown in the table of 1B. the PWM-Buck and PWM_Boost are the output from FIG. 1A.

As compared to the prior art, the DC-DC converter, shown in FIG. 1B, will operate only in buck or boost mode, due to the ability to achieve fully 100% duty cycle. As a result, this solution provides higher efficiency because of reduced dynamic losses due to reduced power switches toggling and an ability to use less expensive and smaller inductors since the average working current is lower for a particular load compared to a the prior art buck mode, buck-boost mode, and boost mode solution.

As compared to a current mode DC-DC converter of the prior art, the efficiency of the solution proposed herein is equally high, but as an advantage over the prior art current mode DC-DC converter, this proposed configuration does not require a current sensing system. Current sensing systems, for higher power applications, are usually complex and may not be used in a voltage mode DC-DC. Moreover, in certain applications, such as for example portable electronics, it is desirable to use high clock frequency DC-DC converters (up to 10 MHz) to reduce the value and size of the external inductors. Voltage mode architectures are usually employed for these types of converters due to the difficulties of accurate current sensing at high speeds. The proposed configuration allows the implementation of efficient buck-boost systems operating at high clock frequencies.

FIG. 3 illustrates an exemplary block diagram of a pulse width modulated signal generator with full circuitry shown for both the buck mode and boost mode. As compared to FIG. 1, FIG. 3 illustrates both the buck and boost aspects (upper and lower paths), and additional details regarding Vref. This is but one possible implementation and as such, other embodiments are contemplated. The error amplifier 304 has a negative input connected to a voltage source that is established by resistor 308A, 308B. At opposing terminals of the resistors 308A, 308B is a ground node and a Vout node. This Vout node may be referenced to the Vout node 174 of FIG. 1B. As can be appreciated, the output voltage is thus used to dynamically establish the outputs of the circuit of FIG. 3. The positive terminal of the error amplifier 304 is tied to Vref. As Vout moves upward or downward and Vref stays constant, the comparison by error amplifier 304 will trigger. The output of the error amplifier 304 connects to the positive terminals of comparators 312, 314 as shown.

Also shown in FIG. 3 is a current source 320A, which has an output connected to a negative terminal of comparator 324 and to a sawtooth reset switch 328A and a capacitor 330A as shown in the upper portion of FIG. 3. The positive terminal of the comparator 324A receives the reference voltage signal Vref as an input signal. In this embodiment, the reference voltage signal Vref is a steady state signal that does not vary with process, temperature or supply.

The output of the comparator 324, and the opposing terminals of the sawtooth reset switch 328A and capacitor 330A connect to a common node which also connects to the negative input of the comparator 312.

The circuit configuration of elements 320B, 324B, 328B, and 330B is shown at the bottom of FIG. 3 is generally similar to the configuration at the top of FIG. 3. In this embodiment, the current source 320B is configured to connect to Vcc instead of ground. The positive terminal of the comparator 324B receives the Vref signal as an input signal. In this section of the circuit the current source 320B is reversed as compared to current source 320A. This can be seen in FIG. 4, discussed below, where signal 420 and signal 434 are of opposing polarity. Thus, signal 420 is above Vref while signal 434 is below Vref. Signal 420 is charging the capacitors 330A while signal 434 is discharging capacitor 330B. Linking FIG. 3 to FIG. 1, the Vref of FIG. 3, which provides the signal to the positive terminal of the error amplifier 304 is also shown in FIG. 1 as the input to the positive terminal of amplifier 118. It is preferred that Vref be constants and not vary over temperature, process, and age. As shown below in FIG. 4, Vref is the constant in relation to both sawtooth signals.

The output of the comparator 312 is presented as an input to buck flip flop 124 of FIG. 1A while the output of compactor 314 is presented as an input to the boost comparator 184 of FIG. 1A. Thus, the comparators 312, 314 trip when the sawtooth signal crosses Vctrl to thereby for the 'set' the input of flip flops 124, 184.

Figure 4:
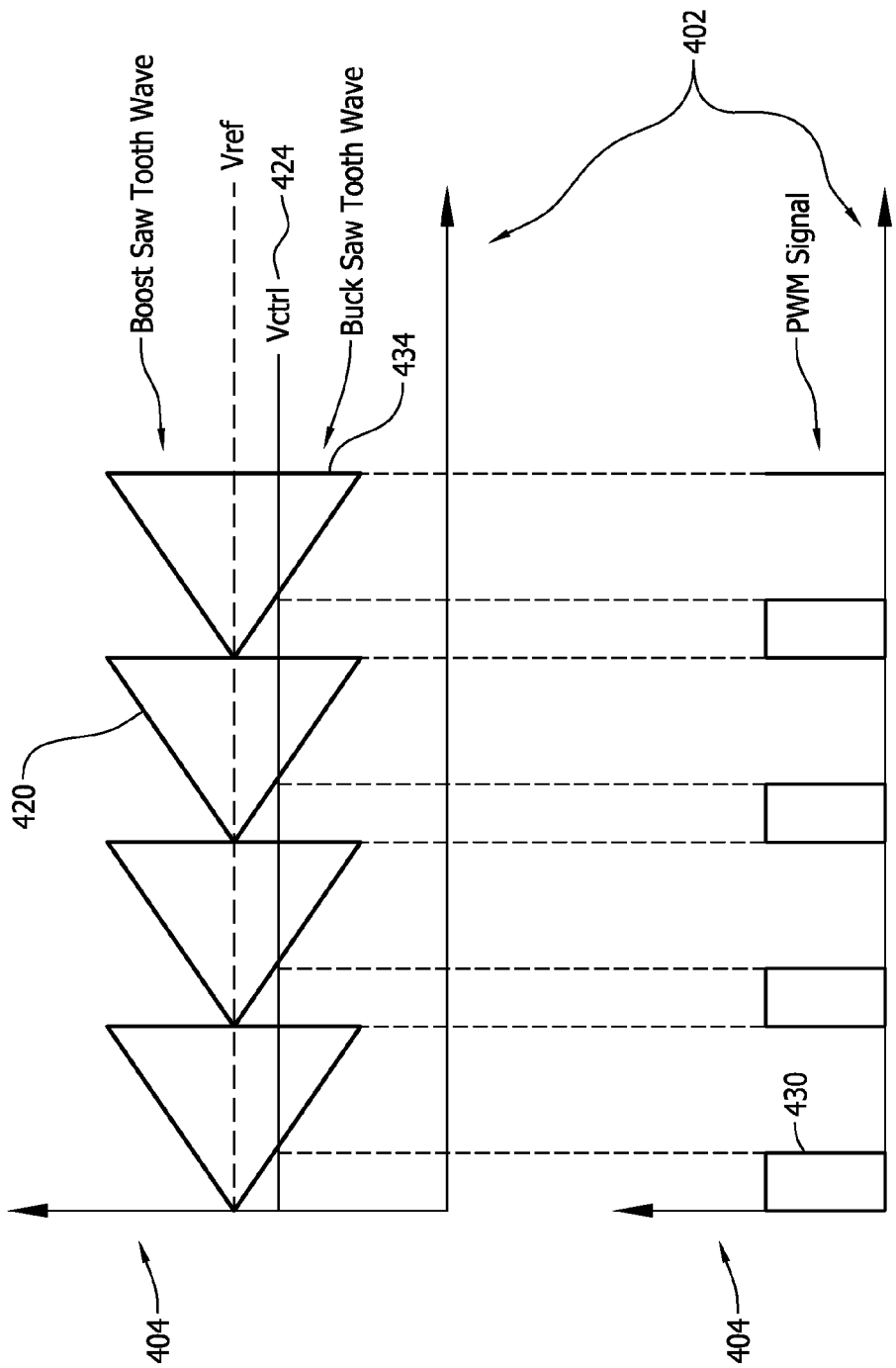
FIG. 4 illustrates an exemplary plot of the sawtooth wave forms in relation to a control voltage value and the resulting pulse width modulated (PWM) signal which controls the DC-DC converter switching.

FIG. 4 illustrates an exemplary plot of the sawtooth wave forms in relation to a control voltage value and the resulting pulse width modulated (PWM) signal which controls the DC-DC converter switching. The horizontal axis 402 represents time while the vertical axis represents magnitude. As can be seen in FIG. 4, the duty cycle of the PWM signal 430 is controlled by the nature of the sawtooth waveform 420 and the value of the control voltage Vctrl 424. When the value of sawtooth signal 420 reaches Vctrl 424 then the PWM signal 430 is triggered to transition. Although shown as a full sawtooth wave form, it is contemplated that it may be a partial sawtooth waveform in operation. Similar operational features are presented for the buck saw tooth wave 434.

FIG. 5 illustrates a block diagram of an exemplary DC-DC converter controller. This is but one possible configuration and arrangement and as such it is contemplated that one of ordinary skill in the art may arrive at other arrangements which do not depart from the claims that follow. Shown at the top of FIG. 5 is a power switch module 508 which represents the switches in FIG. 1B. The power switch module 508 receives switch control inputs 522. An inductor 512 is external to the power switch module 508, but in other embodiments the inductor 512 may be internal to the power switch module. The power switch module 508 receives an input voltage Vin 516 and presents an output voltage Vout 520. The power switch module 508 may include one or more switches and the switches may comprise any type switches including FETs, transistors, relay switches, mechanical switches or any other type switch. The power switch module 508 and the inductor 512, with Vin port 516 and Vout port 520, may be referred to jointly as the DC-DC converter.

The output voltage Vout 520 is presented to an error signal generator 530. The error signal generator compares the output voltage to a reference voltage to generate a control voltage Vctrl. This is shown in greater detail in FIG. 3 as elements 304 and 308A, 308B.

Shown below the power switch module 522 is the DC-DC converter control system 534 which controls operation of the power switch module 508 by generating the switch control signals 522. In this embodiment, the control system 534 includes a negative sawtooth signal generator 540 and a positive sawtooth signal generator 544. These elements could be any signal generator or signal source configured to generate a signal capable of performing a ramp or trigger function as described herein. The negative sawtooth signal generator may be considered for purposes of discussion as elements 328A, 330A, 320A, and 324A in FIG. 3.

The outputs of each signal generator 540, 544 connect to a pulse generator 550. In this embodiment the pulse generator 550 is a pulse width modulated signal generator. In other embodiments, other type signals may be generated. The pulse generator 550 also receives a clock signal from node 554. The clock signal is also provided as a reset signal to the signal generators 540, 544. The Vctrl signal from the error signal generator 530 is also presented to the pulse generator 550.

The pulse generator processes the input signal, (sawtooth signals, clock signal and Vctrl) to generate control signals PWMbck and PWMbst as shown. The PWMbck signal and PWMbst signal control operation of the power switch module 508.

The PWMbck and PWMbst signals are presented to a logic and synchronization unit 560. A clock signal is also provided to the unit 560. The logic and synchronization unit 560 comprises one or more of logic, flip flops, software, state machines or any other circuit to process the PWMbck signal and PWMbst signal into the switch control signals 522. One of ordinary skill in the art is capable of deriving the logic to perform the translation of the PWMbck signal and PWMbst signal to the switch control signal as provided and defined in the table shown in FIG. 1B. One example implementation of the logic and synchronization unit 560 is shown in FIG. 2. Although not shown in FIG. 5, a delay or other device to prevent false triggers may be included in the system of FIG. 5. For example, a delay may be in the DC-DC converter controller 534.

In operation, an input voltage Vin 516 is presented to the power switch module 508 while an output voltage Vout is requested or drawn at the output node 520. To establish the requested Vout at the output node 520 the switches in the switch module 508 are controlled to selectively boost up or buck down the Vin to the output to thereby provide the needed Vout voltage while achieving maximum efficiency.

Responsive to the voltage Vout, the error signal generator 530 generates a control voltage Vctrl based on a comparison or other signal processing in relation to a reference voltage. The Vctrl is provided to the pulse generator 550 for processing with the sawtooth signals. Based on the three received signals, the pulse generator 550 outputs a bck signal and a bst signal, which represent buck enable signal and boost enable signal. In one embodiment the pulse generator 550 is a pulse width modulated signal and the output of the generator 550 is the PWMbck signal and the PWMbst signal.

The PWMbck signal and the PWMbst signals are provided to the logic and synchronization unit 560 which processes the received signals to generate the switch control signals 522. Any type logic or software elements may be enabled to generate the control signals 522 according to the table shown in FIG. 1B. The switch control signals are provided to the power switches module 522.

In this method of operation, the Vout magnitude is utilized to set the values of the switch control signal 522 which in turn sets the output voltage in relation to the input voltage. Thus, the system dynamically adjusts the output voltage, either upward or downward in relation to Vin based on Vout. If the requested Vout is generally the same as Vin, then the system may enter pass-through mode whereby Vin is connected to Vout, either directly or through the inductor 512.

The Vout adjusts and thus Vout changes and so does Vctrl. This changes is much slower than frequency of sawtooth generator signal. The rate of change of the sawtooth generator signal is 10 to 100 time faster than speed with which output voltage changes.

It is also contemplated that in one or more embodiment one or more elements or steps may be implemented in a software driven implementation. As such a memory may be configured to machine readable code, stored in a non-transitory state) that is configured to perform the method set forth herein. The processor would read and execute the software code to generate the control signals for controlling the switches in the DC-DC converter which in turn established buck mode or boost mod having the benefits described above.

Other systems, methods, features and advantages of the invention it will be or will become apparent to one with skill in the art upon examination of the following figures and detailed description. It is intended that all such additional systems, methods, features and advantages be included within this description, be within the scope of the invention, and be protected by the accompanying claims.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A control system for a DC-DC converter comprising:
   a first integrator configured to process a first current signal and a reference voltage;
   a first switch controlled by an integrator reset signal, the first switch configured to selectively reset the first integrator to cause the first integrator to output a first sawtooth wave form signal
   a first comparator configure to compare the first sawtooth wave form signal to a control voltage to generate a buck set signal;
   a second integrator configured to process a second current signal and the reference voltage;
   a second switch controlled by the integrator reset signal, the second switch configured to selectively reset the second integrator to cause the second integrator to output a second sawtooth wave form signal;
   a second comparator configure to compare the second sawtooth wave form signal to the control voltage to generate a boost set signal; and
   a controller configured to receive and process the buck set signal and the boost set signal to generate DC-DC converter control signals which establish the DC-DC converter in buck mode or boost mode, such that buck mode includes a 100% duty cycle and boost mode includes 0% duty cycle.

2. The system of claim 1, wherein the controller includes:
   at least one buck flip flop configured to receive the buck set signal and responsive to the buck set signal output a buck mode control signal; and
   at least one boost flip flop configured to receive the boost set signal and responsive to the boost set signal output a boost mode control signal.

3. The system of claim 1, wherein the controller is further configured to generate one or more switch control signals, the switch control signals establishing DC-DC converter in buck mode, boost mode, or a pass-through mode.

4. The system of claim 1, wherein the controller is further configured to establish the DC-DC converter in a pass-through mode, the pass-through mode being selected by the controller when the DC-DC converter input voltage is generally equal to the DC-DC converter output voltage.

5. The system of claim 1, further including a delay configured to delay a reset signal, the reset signal provided to flip flop.

6. The system of claim 1, wherein the control voltage is generated by an error amplifier.

7. The system of claim 1, wherein the first integrator comprises a capacitor in parallel with a comparator.

8. The system of claim 1, wherein the integrator reset signal is a pulse width modulated signal.

9. A DC-DC converter controller comprising:
a switch module configured to receive an input voltage and one or more switch control signals and output of output voltage;
at least one signal generator configured to generate one or more time varying signals;
an error signal generator configured to compare the output voltage to a reference voltage and generate a control signal;
a pulse generator configured processes the one or more time varying signals and the control voltage to generate a boost mode signal and a buck mode signal; and
control logic configured to receive and processes the boost mode signal and a buck mode signal to generate switch control signals, the control logic configured such that the switch control signal establish the DC-DC converter in a mode during operation consisting of a boost mode and a buck mode, the switch control signals being provided to the switch module to control a position of one or more switches in the switch module to establish the output voltage.

10. The controller of claim 9, wherein the DC-DC converter controller is configured to establish up to 100% duty cycle in buck mode and down to 0% duty in boost mode.

11. The controller of claim 9, wherein the switch module includes an inductor and is configured as a DC-DC converter.

12. The controller of claim 9, wherein the at least one signal generator configured to generate one or more time varying signal is at least one sawtooth generator configured to generate at one or more sawtooth signals.

13. The controller of claim 9, wherein the pulse generator is a pulse width modulated signal generator.

14. The controller of claim 9, wherein the error signal generator comprises a comparator.

15. The controller of claim 9, further comprising a delay in the pulse generator to prevent false triggers from the one or more time varying signals which could change a mode of the DC-DC converter between a buck mode or boost mode.

16. A DC-DC converter with controller comprising:
a DC-DC converter with two or more switches, the DC-DC converter configured to convert an input voltage to an output voltage based on switch control signals;
a pulse generator configured to process a time varying signal and an error signal to generate a boost mode signal and a buck mode signal, the error signal based on the output voltage; and
control logic configured to process the boost mode signal, the buck mode signal, or both, to generate switch control signals which switch the DC-DC converter into either a boost mode or, a buck mode during operation, without transitioning through or entering into a buck-boost mode by establishing switch positions for the two or more switches in the controller based on the switch control signals.

17. The converter of claim 16, further comprising at least one sawtooth signal generator configured to generate at least one sawtooth signal.

18. The converter of claim 16, wherein the pulse generator is a pulse width modulated generator configured to output a pulse width modulated boost signal and a pulse width modulated buck signal.

19. The converter of claim 16, further comprising a comparator configured to compare the output voltage to a reference voltage to generate the error signal.

20. The converter of claim 16, further including a delay to prevent false triggers by the time varying signal to change from modes between buck mode or boost mode of the DC-DC converter.

\* \* \* \* \*